United States Patent Office 3,850,890
Patented Nov. 26, 1974

3,850,890
PROCESS FOR THE ANIONIC POLYMERIZATION OF PYRROLIDONE WITH FLUORO- OR CHLOROFLUORO OLEFIN AS ACTIVATOR
Aldemaro Ciaperoni, Bollate, Italy, assignor to Montecatini Edison S.p.A., Milan, Italy
No Drawing. Filed June 8, 1973, Ser. No. 368,314
Claims priority, application Italy, June 9, 1972, 25,463/72
Int. Cl. C08g 20/18
U.S. Cl. 260—78 P                  12 Claims

ABSTRACT OF THE DISCLOSURE

Polypyrrolidone of high molecular weight and good thermal stability is obtained by anionic polymerization of pyrrolidone in contact with catalytic systems consisting of alkali-metal or quaternary ammonium pyrrolidonate and, as activator, a fluorinated or chlorofluorinated olefin of the formula $$CF_2=CFX$$

in which X is F, Cl, $CF_3$, $CF_2Cl$, $CFCl_2$ or $CCl_3$.

THE PRIOR ART

Various types of "activators" for use in the anionic polymerization of pyrrolidone in the presence of catalysts consisting of alkali pyrrolidonate have been suggested in the patent literature. Included among the known activators are, for instance, acyllactams, esters of mono- and dicarboxylic acids, isocyanates, unsubstituted amides, N-substituted amides, N-cyano-lactams, urea derivatives, carbon dioxide, trityl derivatives, and alo-silanes.

Of the known activators, only a few, such as $CO_2$ and trityl derivatives result in high yields of polypyrrolidone having a molecular weight sufficiently high for the polymer to be suitable for being formed into valuable fibers.

THE PRESENT INVENTION

An object of this invention was to provide a process for the anionic polymerization of pyrrolidone by means of catalyst systems consisting of alkali metal or quaternary ammonium pyrrolidonates and a new activator for the catalyst which would insure the production of high yields of polypyrrolidone having good thermal stability and of a molecular weight suitable for forming valuable fibers.

This and other objects which will appear are achieved by the present invention in accordance with which the anionic polymerization of pyrrolidone is effected in the presence of a catalyst system consisting of an alkali metal or quaternary ammonium pyrrolidonate and, as activator, a fluorinated olefin of the formula $$CF_2=CFX$$

wherein X is F, Cl, $CF_3$, $CF_2Cl$, $CFCl_2$ or $CCl_3$.

Among the non-chlorinated fluorinated olefins the presently preferred activators are tetrafluoroethylene and hexafluoropropylene. Among the chlorofluorinated olefins, chlorotrifluoroethylene is presently preferred.

It has been found, and this is another embodiment of our invention, that the activity of the catalytic systems comprising the fluoro- and chlorofluoro-olefins is considerably increased by including in the system another activator (co-activator) which may be, for example, carbon dioxide, alo-silanes such as trimethylchlorosilane, metal halides such as $SnCl_4$, and isocyanates, for instance phenylisocyanate.

The polypyrrolidone obtained by the present process has values of relative viscosity and of thermal stability deduced from the Thermo Gravimetric Analysis (T.G.A.) values, or from measurements of the loss of viscosity of the polymer in the molten state, or from spinning tests which are always at least comparable to, and sometimes higher than, those values for polypyrrolidone obtained by polymerizing the monomer according to the most effective process of the prior art.

The amount of fluorinated or chlorofluorinated olefin used with the anionic catalyst is in general, from 0.01% to 1.0% molar, preferably from 0.05% to 0.08% molar with respect to the pyrrolidone.

The co-activator, if used in addition to the fluorinated or chlorofluorinated olefin, is present in an amount from 0.01% to 5.0% molar based on the monomer.

The polymerization of pyrrolidone in contact with the catalytic systems of this invention is carried out at a temperature generally comprised between —10° C. and +70° C., preferably between 20° C. and 60° C.

It is possible to conduct the polymerization in either bulk or suspension.

In the case of a bulk polymerization, the obtained polymer is ground many times with water, for example in a Waring-Blendor mill, is optionally washed with acetone and dried to calculate the yield as well as the relative viscosity.

In the case of a suspension polymerization, the monomer is polymerized while dispersed in a non-solvent. Useful non-solvents include petroleum ether, gasoline, kerosene, pentane, hexane, octane, isoctane, cyclohexane, cyclohexene, octene, pentene, and other saturated and unsaturated hydrocarbons. A surfactant which may be either anionic, nonionic or cationic is generally added to the suspension in order to improve its stability.

The degree of subdivision of the resulting polymer may be regulated by varying the ratio of non-solvent to pyrrolidone. Usually, the non-solvent/pyrrolidone ratio is comprised between 0.5 and 5 by volume, preferably between 1 and 3.

It is also possible to carry out the polymerization in a solution of the monomer. Dioxane, benzene, tetrahydrofurane, dimethylformamide are preferred solvents for the monomer.

The following examples are given for illustrative purposes and are not intended to be limiting.

In these examples, where not otherwise specified, the concentration of the components of the catalytic system is expressed by moles and is referred to 100 moles of pyrrolidone.

EXAMPLE 1

4 g. of benzyltrimethylammoniumchloride in 10 cc. of $H_2O$ were dropped on Amberlite IRA-400 (anion exchanging resin of Rohm & Haas), activated with a KOH solution. The benzyltrimethylammonium hydroxide thus obtained (0.13 g./cc.) was mixed in an aqueous solution with 31 g. of pyrrolidone so that the pyrrolidonate salt subsequently formed would have a molar concentration of 3% with respect to the monomer.

The salification was carried out by removing the water by an azeotropic distillation with 800 cc. of xylene at 45° C. and under a residual pressure of 20 mm. Hg, and by heating the mixture for further 2 hours at 60° C. and 0.01 mm. Hg.

Into the vessel containing the pyrrolidone and the 3% molar pyrrolidonate were added 0.62 g. of $C_2F_4$ (139 cc. under normal conditions) corresponding to 1.7% molar with respect to the monomer.

The addition was carried out by means of a gas proportioning device and a capillary tube dipped in the reaction mass, with a gas outflow of 9 minutes.

After 22 hours at room temperature, the thus obtained polymer was repeatedly ground with water in a Waring-Blendor mill, washed with acetone and finally dried.

The polymer yield was 49%. The relative viscosity was 4.9 (for a 1% polymer solution in m-cresol, at 25° C.).

EXAMPLE 2

In the tests conducted at room temperature and reported in the following table, there is evidenced the activity of the fluorinated and chlorofluorinated olefines of this invention in the presence of alkaline pyrrolidonates obtained from potassium hydroxide or from a quaternary ammonia base, according to the modalities described in Example 1.

molecular weight by using relatively low amounts of the components of the catalytic system. The polymer obtained in example 7 was dried at 120° C., under vacuum, for 4 hours and then spun with a spinneret temperature of 270° C. and residence times comprised between 1 minute 25 seconds and 2 minutes 30 seconds. For residence times higher than 2 minutes 30 seconds the filaments are broken owing to the polymer degradation.

EXAMPLE 11

The salification was carried out in this example as described in Example 3, but with 150 g. of pyrrolidone and 10.2 g. (8.6% molar) of KOH. The respective quantities of gaseous $CO_2$ and gaseous $C_2F_4$ were 4% and 0.48%. The $C_2F_4$ was added after the admixture of carbon dioxide. The polymer yield after 21 hours at 55° C. was found to be 50%. The relative viscosity (for a 0.5% polymer solution in m-cresol, at 20° C.) was 8.9.

TABLE I

| | KOH | Quaternary ammonium base | $C_2F_4$ | $C_2F_3Cl$ | $C_3F_6$ | Monomer | Duration of the polymerization (hr.) | Yield (percent) | Relative viscosity, $\eta_r$* |
|---|---|---|---|---|---|---|---|---|---|
| Run: | | | | | | | | | |
| (a) | | 1.7 | 0.84 | | | 100 | 20 | 17 | 5.3 |
| (b) | | 3.0 | 0.6 | | | 100 | 22 | 27 | 5.4 |
| (c) | 10 | | | 0.3 | | 100 | 7 | 26 | 3.7 |
| (d) | 10 | | | | 0.4 | 100 | 7 | 26 | 3.3 |

*For 1% polymer solution in m-cresol, at 25° C.

EXAMPLE 3

40 g. of pyrrolidone were mixed in a flask with 2.7 g. of 85% KOH (8.6% molar with respect to the monomer).

The salification was then carried out by distilling the water at 115° C. under a 4–5 mm. Hg vacuum, for a period of from 15 to 30 minutes. After cooling, 0.83 g. of gaseous $CO_2$ (4% molar) were added simultaneously with 0.29 g. of gaseous $C_2F_4$ (0.62% molar).

The addition of the gases required 3 minutes and 50 seconds. The polymerization mass was then maintained for 21 hours and 30 minutes in a bath thermostatically kept at 55° C. After grinding the polymer according to the procedures described in Example 1, the yield was 50%. The relative viscosity for a 0.5% polymer solution in m-cresol, at 20° C. was 9.1.

EXAMPLES 4–10

Into a 500 cc. flask provided with stirrer were introduced 255 g. (3 moles) of pyrrolidone and 85% KOH. At 110–115° C., under a 3–5 mm. Hg vacuum, the two reagents salify and water was distilled off. The time required, for the salification depended on the amount of KOH used. At the end of this operation the pressure was restored in the flask by pure nitrogen and then an established amount of tetrafluoroethylene was bubbled into the polymerization medium under strong stirring. The bubbling of the gas was ended within a period of time ranging from 1 minute to 30 minutes.

The results are reported in the following table.

TABLE II

| Example number | KOH | $C_2F_4$ | Monomer | Duration of polymerization (hr.) | Yield (percent) | $\eta_r$* |
|---|---|---|---|---|---|---|
| 4 | 3 | 0.0075 | 100 | 21 | 13 | 2.9 |
| 5 | 3 | 0.3 | 100 | 65 | 74 | 2.6 |
| 6 | 3 | 0.3 | 100 | 8 | 30 | 2.2 |
| 7 | 3 | 0.3 | 100 | 23 | 45 | 3.8 |
| 8 | 6 | 0.23 | 100 | 18 | 37 | 2.3 |
| 9 | 1.5 | 0.3 | 100 | 18 | 24 | 2.5 |
| 10 | 3 | 0.8 | 100 | 20 | 55 | 2.3 |

*Measured in a 0.5% polymer solution in 96% $H_2SO_4$, at 20° C.

The examples evidence that the pyrrolidone polymerization rate in the presence of tetrafluoroethylene is high enough, although it depends on the amount of the introduced gas. Besides, the above reported examples evidence that the polymer is obtained in high yields and high

EXAMPLES 12–16 BIS

This set of examples evidences the activity of the tetrafluoroethylene also in the case that in the catalytic system consisting of KOH, $CO_2$ and $C_2F_4$, the quantity of $CO_2$ used is below 4% molar; the conversion and the viscosity do not appreciably change with reference to the values reported in the preceding examples. The tests were conducted at temperatures comprised between 50° C. and 55° C.

TABLE III

| Ex. No. | KOH | $CO_2$ | $C_2F_4$ | Monomer | Duration of the polymerization | Yield (percent) | Relative viscosity, $\eta_r$* |
|---|---|---|---|---|---|---|---|
| 12 | 10 | 2 | 0.2 | 100 | 14ʰ30ᵐ | 45 | 7 |
| 13 | 10 | 2 | 0.1 | 100 | 4ʰ | 16 | 3.9 |
| 14 | 10 | 2 | 0.1 | 100 | 7ʰ30ᵐ | 26 | 6.1 |
| 15 | 10 | 2 | 0.1 | 100 | 14ʰ30ᵐ | 45 | 8.6 |
| 16 | 10 | 1 | 0.1 | 100 | 14ʰ30ᵐ | 43 | 6.8 |
| 16 bis | 10 | 1.2 | 0.05 | 100 | 15ʰ | 41 | 15.2 |

*Measured in a 0.5% polymer solution in m-cresol, at 20° C.

EXAMPLE 17

In this example the salification of the pyrrolidone was carried out according to the procedures described in Example 3, but with 3.1 g. of 85% KOH (10% molar with respect to the monomer).

Into the mass consisting of pyrrolidone and potassium pyrrolidonate was then injected a quanity of $CO_2$ corresponding to 1% molar (0.206 g.).

After 20 hours at 55° C., the polymer yield was found to be 0.15%. The relative viscosity was 2.6 (in a 0.5% polymer solution in m-cresol at 20° C.).

This example clearly evidences the importance of the presence of $C_2F_4$ in the catalytic system. This effect is so much the more evident when the results of this example are compared with those of Examples 16 and 16 bis.

EXAMPLES 18–22

The examples listed in the following Table IV evidence the effect of hexafluoropropylene ($CF_3$—$CF$=$CF_2$) on the polymerization of the pyrrolidone in the presence of catalysts based on potassium pyrrolidonate and $CO_2$.

TABLE IV

| Ex. No. | KOH | CO$_2$ | C$_3$F$_6$ | Monomer | Duration of the polymerization | Yield (percent) | Relative viscosity, $\eta_r$* |
|---|---|---|---|---|---|---|---|
| 18 | 10 | 4 | | 100 | h 30E | 11.5 | 5.9 |
| 19 | 10 | 4 | 0.4 | 100 | 7$30E | 62 | 2.8 |
| 20 | 10 | 4 | 0.4 | 100 | 15$ | 65 | 3.3 |
| 21 | 10 | 4 | 0.1 | 100 | 15$30E | 50 | 5.6 |
| 22 | 10 | 2 | 0.2 | 100 | 7$30E | 59 | 3 |

*Measured in a 0.5% polymer solution in m-cresol, at a temperature of 20° C.

EXAMPLES 23–27

The examples reported in Table V, illustrate the effect of chlorotrifluoroethylene (C$_2$F$_3$Cl) on the polymerization of the pyrrolidone, in the presence of an alkaline pyrrolydonate and CO$_2$.

TABLE V

| Ex. No. | KOH | CO$_2$ | C$_2$F$_3$Cl | Monomer | Duration of the polymerization (hr.) | Yield (percent) | Relative viscosity, $\eta_r$* |
|---|---|---|---|---|---|---|---|
| 23 | 10 | 4 | 0.2 | 100 | 7 | 43 | 4.9 |
| 24 | 10 | 4 | 0.2 | 100 | 15 | 60 | 4.4 |
| 25 | 10 | 2 | 0.2 | 100 | 15 | 52 | 3.3 |
| 26 | 10 | 1 | 0.3 | 100 | 15 | 58 | 3.6 |
| 27 | 10 | 4 | | 100 | 7 | 11.5 | 5.9 |

*Measured in a 0.5% polymer solution in m-cresol, at a temperature of 20° C.

EXAMPLES 28–32

255 g. (3 moles) of pyrolidone and 6.0 g. (0.09 mol) of 85% KOH were introduced into a 500 cc. flask provided with agitator.

By heating at 110–115° C. and 1.5–3 mm. Hg the water distilled owing to the salification reaction of the reactants. Under the described conditions, the time required for the salification was about 10 minutes. The flask was then cooled and the pressure in the flask was restored by anhydrous and oxygen-free nitrogen. When the temperature had fallen to 30° C., the established amount of trimethylchlorosilane (TCS) was injected in the flask while stirring and then, under stirring, the established volume of C$_2$F$_4$ was injected. The operation required from 4 minutes 30 seconds to 8 minutes according to the amount of the fluorinated olefin used. At the end of the addition of tetrafluoroethylene, the viscosity of the polymerization mass quickly increased thus making further stirring impossible.

The flask was then washed with nitrogen and left in an oven at 50° C. The results of the tests are reported in the following Table VI.

TABLE VI

| Ex. No. | KOH | C$_2$F$_4$ | TCS | Monomer | Duration of the polymerization (hr.) | Yield (percent) | Relative viscosity, $\eta_r$* |
|---|---|---|---|---|---|---|---|
| 28 | 2.7 | | 0.1 | 100 | 24 | 25 | 4.8 |
| 29 | 3.0 | 0.23 | 0.1 | 100 | 24 | 57 | 4.1 |
| 30 | 3.0 | 0.1 | 0.1 | 100 | 24 | 42 | 4.7 |
| 31 | 3.0 | 0.1 | 0.005 | 100 | 24 | 32 | 3.6 |
| 32 | 3.0 | 0.23 | 0.05 | 100 | 24 | 45 | 4.9 |

*Measured in 0.5% polymer solution in 96% H$_2$SO$_4$, at 20° C.

In Examples 28 to 32, the order of addition of C$_2$F$_4$ and TCS may be reversed without varying the results. The polymer obtained in Example 29 was dried at 120° C. under vacuum for 4 hours and then spun with a spinneret temperature of 270° C. and a residence time of 1 minute 40 seconds to 1 minute 50 seconds.

EXAMPLES 33–36

These examples further evidence the effect of tetrafluoroethylene on the polymerization rate.

The catalyst consisted of potassium pyrrolidonate and SnCl$_4$ as coactivator.

The operative modalities in these tests were identical to those described in the preceding examples in particular as to the formation of the potassium pyrrolidonate from KOH and pyrrolidone. The order of addition of C$_2$F$_4$ and SnCl$_4$, under stirring, at 30° C., may be reversed without any variation of the results.

The time required for the bubbling of C$_2$F$_4$ in the reaction mass was 2–5 minutes according to the volume of C$_2$F$_4$ used. In all the examples the polymerization was carried out at 50° C. The results of the tests are reported in the following Table VII.

TABLE VII

| Ex. No. | KOH | C$_2$F$_4$ | SnCl$_4$ | Monomer | Duration of the polymerization (hr.) | Yield (percent) | Relative viscosity, $\eta_r$* |
|---|---|---|---|---|---|---|---|
| 33 | 3 | | 0.3 | 100 | 71 | 31 | 4.7 |
| 34 | 3 | 0.1 | 0.3 | 100 | 23 | 31 | 3.8 |
| 35 | 3 | 0.3 | 0.3 | 100 | 19 | 68 | 4.0 |
| 36 | 3 | 0.6 | 0.3 | 100 | 22 | 73 | 3.6 |

*Measured in a 0.5% polymer solution in 96% H$_2$SO$_4$, at 20° C.

EXAMPLE 37

After salification of KOH and pyrrolidone as described in Examples 28–32, the solution containing pyrrolidone and potassium pyrrolidonate was added, under stirring, with 0.031 g. of phenylisocyanate (corresponding to 0.086 moles with respect to the monomer). Then, 217 cc. (measured at 21° C. and 1 atmosphere) of gaseous C$_2$F$_4$ (corresponding to 0.3% mol on the monomer) were bubbled into the solution within about 5 minutes.

After 17 hours 30 minutes at 55° C. the polymer yield was 48%; the relative viscosity of the polymer was 3.8.

EXAMPLE 38

This example evidences that the thermal stability of polypyrrolidone (A) (expressed by the thermogravimetric analysis), obtained according to this invention with a catalyst based on alkaline pyrrolidonate, CO$_2$ and fluorinated olefins is greated than the thermal stability of the polymers (B) obtained with the same catalyst but in the absence of the olefin.

In the following table the thermal stabilities have been expressed by the values of the time required to achieve decompositions of 10% ($t_{10}$) and 50% ($t_{50}$), at 275° C.

| Sample: | Relative viscosity | $t_{10}$ | $t_{50}$ |
|---|---|---|---|
| A | 9.1 | 0$^h$9$^m$30$^s$ | 0$^h$49$^m$ |
| B | 5.8 | 0$^h$9$^m$ | 0$^h$19$^m$30$^s$ |
| A | 9.1 | 0$^h$10$^m$30$^s$ | 0$^h$37$^m$ |
| A | 6.8 | 0$^h$12$^m$30$^s$ | 0$^h$68$^m$ |

EXAMPLE 39

This example demonstrates the thermal stability in the molten state of samples of polypyrrolidone (A) prepared according to this invention and that of samples (B) obtained by the same catalytic system but in the absence of the fluorinated compound.

The tests were carried out by means of a Melt-Flow-Index apparatus at a temperature of 275° C., on the polymer subjected to a weight of 1260 g.

The stability has been expressed as the "time interval" that elapses between the moment in which the molten polymer starts to leave the ejector nozzle of the apparatus in the form of noodles and the moment in which the thermally degraded polymer leaves the nozzle in the form drops.

| Sample | Relative viscosity, $\eta_r$ | Stability |
|---|---|---|
| A | 5.2 | 0h3m |
| A | 8.6 | 0h2m20s |
| A | 9.1 | 0h3m45s |
| B | 6.5 | 0h3m |
| B | 5.4 | 0h2m |

I claim:

1. A process for the anionic polymerization of pyrrolidone to a fiber-forming polypyrrolidone which comprises polymerizing said monomer in contact with a catalytic system consisting essentially of an alkali metal or quaternary ammonium pyrrolidonate and, as activator, a substituted olefin having the general formula $$CF_2=CFX$$

wherein X is F, Cl, $CF_3$, $CF_2Cl$, $CFCl_2$ or $CCl_3$.

2. The process of claim 1, wherein the catalytic system consists essentially of, in addition to the activator $$CF_2=CFX$$

a co-activator different from the fluorinated and chlorofluorinated olefins.

3. The process of claim 1, wherein the activator of formula $CF_2=CFX$ is tetrafluoroethylene.

4. The process of claim 1, wherein the activator of formula $CF_2=CFX$ is hexafluoropropylene.

5. The process of claim 1, wherein the activator of formula $CF_2=CFX$ is chlorotrifluoroethylene.

6. The process of claim 1, wherein the amount of the activator of formula $CF_2=CFX$ in the catalytic system is from about 0.01% to about 1.0% molar, based on the pyrrolidone.

7. The process of claim 1, wherein the amount of the activator of formula $CF_2=CFX$ in the catalytic system is from about 0.05% to about 0.8% molar, based on the pyrrolidone.

8. The process of claim 2, wherein the co-activator is $CO_2$.

9. The process of claim 2, wherein the co-activator is trimethylchlorosilane.

10. The process of claim 2, wherein the co-activator is $SnCl_4$.

11. The process of claim 2, wherein the co-activator is phenylisocyanate.

12. The process of claim 2, wherein the co-activator is present in the catalytic system in an amount of from about 0.1% to about 5.0% molar based on the pyrrolidone.

References Cited

UNITED STATES PATENTS 3,721,652   3/1973   Barnes _____ 260—78 P

HAROLD D. ANDERSON, Primary Examiner

UNITED STATES PATENT AND TRADEMARK OFFICE
CERTIFICATE OF CORRECTION

PATENT NO. : 3,850,890
DATED : Issued November 26, 1974
INVENTOR(S) : Aldemaro Ciaperoni It is certified that error appears in the above-identified patent and that said Letters Patent are hereby corrected as shown below:

Col. 4, line 57, "procerdues" should read - - -procedures- - -.

Col. 5, 5th col. from the left, the values under the heading "Duration of the polymerization (hr)" for Ex. 18-22, should read "7 h 30 m; 7 h 30 m; 15 h; 15 h 30 m; 7 h 30 m;"

line 32, "pyrolidone" should read "pyrrolidone"

Col. 6, line 42, "the" should read "a".

Signed and Sealed this sixth Day of January 1976

[SEAL]

Attest:

RUTH C. MASON
Attesting Officer

C. MARSHALL DANN
Commissioner of Patents and Trademarks